United States Patent [19]

Yamamoto et al.

[11] 3,888,921

[45] June 10, 1975

[54] METHOD FOR PURIFYING 2,6-NAPHTHALENEDICARBOXYLIC ACID

[75] Inventors: Kiyoshi Yamamoto; Gentaro Yamashita, both of Iwakuni, Japan

[73] Assignee: Teijin Ltd., Osaka, Japan

[22] Filed: May 31, 1973

[21] Appl. No.: 365,702

[52] U.S. Cl. ............................................. 260/525
[51] Int. Cl. ............................................. C02c 63/68
[58] Field of Search ................................... 260/525

[56] References Cited
UNITED STATES PATENTS

| | | | |
|---|---|---|---|
| 3,243,458 | 3/1966 | Melchiore et al. | 260/525 |
| 3,249,634 | 5/1966 | Wynkoop | 260/525 |
| 3,253,024 | 5/1966 | Bohrer et al. | 260/525 |

*Primary Examiner*—Lorraine A. Weinberger
*Assistant Examiner*—Richard D. Kelly
*Attorney, Agent, or Firm*—Sherman & Shalloway

[57] ABSTRACT

A method for purifying a crude 2,6-naphthalenedicarboxylic acid obtained by the oxidation of a 2,6-dialkylnaphthalene, which comprises a. preparing an aqueous solution of a dialkali salt of said crude 2,6-naphthalenedicarboxylic acid,
b. precipitating 40 to 97 mol percent of the dialkali 2,6-naphthalenedicarboxylate dissolved in said aqueous solution substantially as a monoalkali salt of the 2,6-naphthalenedicarboxylic acid while maintaining the pH of said aqueous solution at a value not lower than 6.3, and separating the precipitate, and
c. converting the separated precipitate to a 2,6-naphthalenedicarboxylic acid.

If desired, the aqueous solution prepared in step (a) may be treated with an adsorbent prior to being subjected to step (b). This treatment results in the removal of most of the coloring impurities contained in the crude starting material.

11 Claims, No Drawings

METHOD FOR PURIFYING 2,6-NAPHTHALENEDICARBOXYLIC ACID

This invention relates to a method for purifying 2,6-naphthalenedicarboxylic acids obtained by the oxidation of 2,6-dialkylnaphthalenes.

Polyethylene naphthalate obtained by the reaction of a 2,6-naphthalenedicarboxylic acid with ethylene glycol is very useful as a material for forming fibers, films, or plastics because of its excellent physical and chemical properties. Conventional techniques for preparing 2,6-naphthalenedicrboxylic acid useful as a starting material for polyethylene-2,6-naphthalate include a method wherein 2,6-dialkylnaphthalenes such as 2,6-dimethylnaphthalene are oxidized in the presence of an oxidation catalyst containing a heavy metal and bromine, and a method wherein the 2,6-dialkylnaphthalenes are oxidized with $NO_2$ in a solvent inert to $NO_2$ and in the presence of Se or $SeO_2$.

In the present specification, the 2,6-naphthalenedicarboxylic acid, polyethylene-2,6-naphthalate, 2,6-naphthalenedicarboxylic acid dialkali salt, and 2,6-naphthalenedicarboxylic acid monoalkali salt will sometimes be referred to by abbreviations 2,6-NA, 2,6-PEN, $M_2$-NA, and M-NA, respectively.

The crude 2,6-naphthalenedicarboxylic acid (crude 2,6-NA) contains various impurities, such as naphthalenedicarboxylic acids other than 2,6- ascribable to isomers other than the 2,6-dialkylnaphthalene which are contained in the starting 2,6-dialkylnaphthalene, and the bromine-substituted derivatives of the naphthalenedicarboxylic acids ascribable to bromine or bromine compounds used as a promotor for the oxidation reaction, such as 1,5-, 1,6-, 1,7-, 1,8, 2,3-, 2,7 1,2-, 1,3- and 1,4-naphthalenedicarboxylic acids, and the bromine substituted derivatives of these naphthalenedicarboxylic acids and 2,6-NA. In the present specification, these impurities are generally called 2,6-NA isomers and bromine derivatives.

The impurities of the crude 2,6-naphthalenedicarboxylic acids obtained by the oxidation reaction of 2,6-dialkylnaphthalenes also include various aldehydes as oxidation intermediates of the starting 2,6-dialkylnaphthalene, 6-carboxy-2-naphthaldehyde being a main constituent. Furthermore, the crude 2,6-NA contains coloring substances whose structures cannot be identified, and the oxidation catalysts used, such as compounds of heavy metals such as cobalt or manganese.

Accordingly, in order to use 2,6-NA for the production of 2,6-PFN, it is necessary to remove from it the aforementioned impurities such as (1) 2,6-NA isomers and their bromine derivatives, (2) aldehydes, (3) coloring matters and (4) heavy metal compounds. If the 2,6-NA contains 2,6-NA isomers and their bromine derivatives, the softening point of the 2,6-PEN characterized by its higher melting point than that of polyethylene terephthalate. Furthermore, the aldehydes and coloring substances become a cause of coloring of 2,6-PEN. When the heavy metal compounds (4) are present in the 2,6-NA, the control of polymerization becomes difficult, and the quality of the resulting 2,6-PEN is reduced.

Accordingly, an object of this invention is to provide a method for separating and removing 2,6-NA isomers and their bromine derivatives from crude 2,6-NA obtained by the oxidation of 2,6-dialkylnaphthalenes.

Another object of this invention is to provide a method for separating and removing aldehydes and/or coloring substances contained as impurities in the crude 2,6-NA.

Still another object of this invention is to provide a method for purifying crude 2,6-NA to pure 2,6-NA capable of being used for production of 2,6-PEN having a high melting point and being free from coloration, by separating and removing the heavy metal compounds in addition to the above impurities.

Further objects of the present invention along with its advantages will become apparent from the following description.

According to the present invention, the above objects and advantages, especially the decomposition and removal of 2,6-NA isomers and their bromine derivatives contained as impurities in the crude 2,6-NA, are achieved by a method for purifying crude 2,6-naphthalenedicarboxylic acid obtained by the oxidation of a 2,6-dialkylnaphthalene, which comprises a. preparing an aqueous solution of a dialkali salt of said crude 2,6-naphthalenedicarboxylic acid (to be referred to as step A), b. precipitating 40 to 97 mole percent of the dialkali 2,6-naphthalenedicarboxylate dissolved in said aqueous solution substantially as a monoalkali salt aqueous solution of the 2,6-naphthalenedicarboxylic acid while maintaining the pH of said aqueous solution at a value not lower than 6.3, and separating the precipitate (to be referred to as step B), and c. converting the separated precipitate to a 2,6-naphthalenedicarboxylic acid (to be referred to as step C).

This method also makes it possible to remove part or a considerable portion of coloring substances contained in the crude 2,6-NA.

If step A is performed by treating an aqueous solution of a dialkali 2,6-naphthalenedicarboxylate (crude $M_2$-NA) with a solid absorbent, and then subjecting it to the aforementioned purifying method, it is not only posible to separate and remove almost all of the coloring substances in addition to the 2,6-NA isomers and their bromine derivatives, but also to remove a considerable portion of the aldehydes.

Furthermore, since the heavy metal compounds contained in the crude 2,6-NA can be converted to water-insoluble hydroxides and/or carbonates, they can be readily separated and removed in step A by such a procedure as filtration or centrifugal separation. The present invention will be further described below.

STARTING MATERIAL

The crude 2,6-naphthalenedicarboxylic acids used in the method of the present invention may be any 2,6-naphthalenedicarboxylic acids obtained by oxidizing 2,6-dialkylnaphthalenes such as 2,6-dimethylnaphthalene, 2,6-dipropylnaphthalene, 2-methyl-6-ethylnaphthalene or 2-methyl-6-propylnaphthalene. Methods for oxidizing 2,6-dialkylnaphthalenes include a Methods (disclosed in U.S. Pat. No. 2,833,816) wherein they are oxidized in the presence of an oxidation catalyst containing heavy metals and bromine, a method (disclosed in British Patent No. 956,382) wherein they are oxidized with $NO_2$ in a solvent inert to $NO_2$ and in the presence of Se or $SeO_2$, a method (disclosed in U.S. Pat. No. 3,193,577) wherein they are oxidized with $SO_2$ in the presence of bromine, iodine and compounds of these, or a method wherein they are oxidized with an aqueous solution of a bichromate salt.

The purifying method of this invention can be applied with good result especially to crude 2,6-NA obtained by oxidizing 2,6-dimethylnaphthalene with a molecular oxygen-containing gas in an acetic acid solvent in the presence of a compound of a heavy metal such as cobalt or manganese and bromine or a bromine compound, as already proposed in the above cited U.S. Pat. No. 2,833,816 by the same inventors as the present application.

STEP A

First, an aqueous solution of a dialkali salt of the crude 2,6-NA is prepared. This can be accomplished by dissolving the crude 2,6-NA obtained by the oxidation of 2,6-dialkylnaphthalene in an aqueous alkali solution to form an aqueous solution of crude $M_2$-NA. The aqueus solution of alkali may, for example, be aqueus solutions of sodium hydroxide, potassium hydroxide, sodium carbonate, potassium carbonate, sodium hydrogen carbonate, potassium hydrogencarbonate, potassium sulfite, sodium sulfite, potassium bisulfite, or sodium bisulfite. Especially, sodium hydroxide, potassium hydroxide, potassium carbonate, potassium hydrogen carbonate, and sodium hydrogencarbonate are preferred. There may also be used aqueous ammonia, or aqueous solutions of water-soluble organic amines such as monomethyl amine, monoethyl amine, ethylene diamine or hexamethylene diamine.

The amount of these alkalis may be at least equivalent to the 2,6-naphthalenedicarboxylic acid and aldehyde acid. If the amount of the aldehyde acid is large, it is preferred to use an excess of sodium hydroxide or potassium hydroxide.

STEP B

Step B comprises precipitating 40 to 97 mol percent of a dialkali salt of 2,6-naphthalenedicarboxylic acid dissolved in the aqueous solution substantially as a monoalkali salt (M-NA) of the 2,6-naphthalenedicarboxylic acid while maintaining the pH of the aqueous solution at a value not lower than 6.3, and separating the precipitate.

When a precipitate consisting substantially of M-NA is precipitated from an aqueous solution of $M_2$-NA, it is advantageous in the present invention to maintain the pH of the aqueous solution of the crude $M_2$-NA at a value not lower than 6.8, especially not lower than 7.0. Furthermore, it is very advantageous to precipitate 50 to 95 mole percent of $M_2$-NA dissolved in the aqueous solution while maintaining its pH at such a value.

The precipitation of M-NA from an aqueous solution of $M_2$-NA is effected by the use of mineral acids such as hydrochloric acid, sulfuric acid, or nitric acid; organic acids which are soluble in water and have a pKa of less than 5.4 such as formic acid, acetic acid, propionic acid or chloroacetic acid; compounds convertible to acidic substances upon contact with water such as acetic anhydride; and compounds such as carbon dioxide gas or sulfurous acid gas.

When an acid or acid-forming agent is added to an aqueous solution of the crude $M_2$-NA to precipitate M-NA and/or 2,6-NA, it is possible to set the pH of the aqueous solution at a value lower than 6.3 specified in the present invention. Especially in order to precipitate 2,6-NA, it is necessary to adjust the pH of the aqueous solution, for example, to 3 or less.

According to the instant invention, when 2,6-NA is directed precipitated from an aqueous solution of crude $M_2$-NA, the isomers of the 2,6-NA and their bromine derivatives and coloring substances are similarly precipitated. It has however been found to our surprise that when M-NA is precipitated by adding the acid or acid-forming agent to the aqueous solution while maintaining its pH at a value not lower than 6.3, preferably not lower than 6.8, a greater part of substantially all of the 2,6-NA isomers and bromine derivatives is caused to remain dissolved in the aqueous solution and a precipitate consisting substantially of M-NA can be separated. In this sense, it is most preferred to precipitate M-NA while maintaining the pH of the aqueous solution at a value not lower than 7. Even in the case of precipitating M-NA under such pH conditions, if substantially all of $M_2$-NA dissolved in the aqueous solution is precipitated, the 2,6-Na isomers and bromine compounds as impurities come into the precipitate. However, by precipitating 40 – 97 mol percent preferably 50 – 95 mol percent, of $M_2$-NA dissolved in the aqueous solution as M-NA while maintaining the above pH conditions, the 2,6-NA isomers and bromine derivatives contained as impurities in the crude 2,6-Na can be well separated, and in addition, a considerable portion of the coloring substances contained in the crude 2,6-NA can be caused to remain dissolved in the aqueous solution, and M-NA can be separated. Thus, a considerable portion of these coloring substances can be separated and removed.

The minimum concentration of $M_2$-NA in the aqueous solution at which a precipitate consisting substantially of M-NA can be precipitated under the above conditions differs according to the type of the alkali that forms the dialkali salt and the temperature and pressure for precipitating M-NA. One example will be shown below.

When the above precipitation is carried out at 30°C. and atmospheric pressure, for example:

In the case of potassium salts:
not less than 3 percent by weight an up to the saturation solubility as the concentration of the dipotassium 2,6-naphthalenedicarboxylic acid.

In the case of sodium salts:
not less than 5 percent by weight and up to the saturation solubility as the concentration of the disodium 2,6-naphthalenedicarboxylate.

IN the case of ammonium salts:
not less than 1 percent by weight and up to the saturation solubility as the concentration of diammonium 2,6-naphthalenedicarboxylate.

Generally, the above precipitation can be performed at a temperature above the melting point of the solution and a temperature at which M-NA can be precipitated. Usually, it is preferred to perform it at a temperature of 5° to 80°C. Suitable conditions should be selected within this range with regard to the type of the alkali of $M_2$-NA, its concentration, and the pressure used at the time of precipitation.

Furthermore, it is preferred that the precipitation of the M-NA should be performed under conditions such that the precipitated M-NA will not form 2,6-NA as a result of disproportionation before separation from the aqueous solution. Generally, when the concentration of $M_2$-NA is very small, the disproportionation of M-NA precipitated from it tends to occur. Accordingly, it is preferred that the operation of precipitating M-NA should be applied to an aqueous solution which contains $M_2$-NA dissolved therein in a concentration at least 1 percent by weight, preferably at least 2 percent by weight, higher than the minimum concentration at which M-NA can be precipitated.

Where a precipitate consisting substantially of M-NA is precipitated from an aqueous solution of $M_2$-NA, it is preferred that the separation should be performed at atmospheric pressure in the case of adding a mineral acid. But when an acid forming agent such as carbon dioxide is added to an aqueous solution of a disodium salt of 2,6-NA, the degree of precipitation of M-NA can be increased, for example, by performing the precipitating operation at an elevated pressure of not more than several atmospheres or at relatively low temperatures, or both at elevated pressures and at low temperatures. The preferred temperature for precipitation using carbon dioxide gas is 0° to 70°C.

The precipitate consisting substantially of M-NA is then separated from the aqueous solution by a solid-liquid separating method such as filtration, centrifugal separation or centrifugal precipitation, and the purified M-NA is first obtained.

The mother liquor obtained by separation of the precipitated M-NA still contains a small amount of $M_2$-NA. This can be subjected to acid precipitation to convert it to 2,6-NA, which after separation can be used as a starting material in step A. Furthermore, when carbon dioxide gas or sulfurous acid gas is used for the separation of M-Na, the mother liquor after separation of M-NA contains an alkali bicarbonate or an alkali bisulfite in addition to a small amount of unreacted $M_2$-NA. Therefore, it can be used again for dissolving crude 2,6-NA At this time, an aqueous solution of the alkali bicarboinate may be used as such for dissolving crude 2,6-NA. At this time, an aqueous solution of the alkali bicarbonate may be used as such for dissolving crude 2,6-NA. Or it may be used for this purpose after heating it to drive off carbon dioxide gas and thereby convert it to an alkali carbonate. Carbon dioxide gas generated at this time or carbon dioxide generated at the time of neutralizing crude 2,6-naphthalenedicarboxylic acid can be recovered, and recycled to the step of precipitating M-NA. The same procedure can be used in the case of sulfurous acid gas.

STEP C

M-NA precipitated and separated in step B is then converted to 2,6-naphthalenedicarboxylic acid (2,6-NA).

The conversion of it to 2,6-NA can be performed by various methods such as (C-1) disproportionation, (C-2) acid precipitation or (C-3) heating (when M-NA is an ammonium salt).

The disproportionation reaction (C-1) is expressed by the following formula:

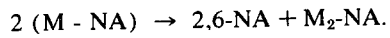

2 (M - NA) → 2,6-NA + $M_2$-NA.

The disproportionation reaction can be performed by maintaining M-NA at room temperature or preferably at an elevated temperature in the presence of water.

When the M-NA salt is contacted with water to disproportionate it to 2,6-NA and $M_2$-NA, the preferred amount of water to be used is 10 to 100 times (in the case of the monopotassium salt), and 3 to 50 times (in the case of the monosodium salt), the weight of water. The reaction temperature is preferably as high as possible. When the amount of water is relatively large, for example, at least 20 times by weight in the case of the monopotassium salt, and at least 5 times by weight in the case of the monosodium salt, the temperature may sufficiently be the boiling temperature at atmospheric pressure. If the amount of water used is less than the above-cited values, the reaction is preferably carried out at a temperature of not less than 100°C. at an elevated pressure.

By disproportionating the monoalkali salt under these conditions, 2,6-NA is precipitated. It is separated from the mother liquor containing $M_2$-NA, and washed with water to remove the adhering alkali salt, followed by drying. This procedure gives the desired 2,6-NA of high purity.

The mother liquor from which 2,6-NA has been separated is recycled to step B as such or after concentration.

The conversion of M-NA into 2,6-NA can be carried out by acid precipitation of (C-2). Such acid precipitation can be effected also by suspending the precipitated M-NA in water and adding an inorganic acid such as hydrochloric acid, sulfuric acid or nitric acid or an organic acid such as formic acid, acetic acid, or chloroacetic acid.

Where the M-NA is a monoammonium salt of 2,6-NA, it can be converted to 2,6-NA by heating it to an elevated temperature, for example, 200°C.

Most advantageously, M-NA is converted to 2,6-NA by the disproportionation method (C-1).

The above-described method makes it possible to obtain 2,6-NA from M-NA substantially in a 100 percent yield.

By subjecting crude 2,6-NA to the above-described steps A, B and C, a greater part or substatially all of the 2,6-NA isomers and their bromine derivatives can be separated and removed, and a considerable part of the coloring substances can also be separated and removed.

However, when the crude 2,6-NA contains relatively large amounts of the coloring substances or it is desired to obtain purified 2,6-NA of pure white or of reduced coloration, it is advantageous to treat an aqueous solution of the crude $M_2$-NA obtained in step A with a solid adsorbent by the procedure to be described, before subjecting it to steps B and C.

SOLID ADSORBING TREATMENT

If desired, an aqueous solution of the crude $M_2$-NA obtained in step A is treated with a solid adsorbing agent. Examples of the solid adsorbent are activated carbon, active alumina, active magnesia or ion-exchange resins. The use of activated carbon is especially preferred. The amount of the solid adsorbent to be used differs depending upon the amounts of impurities contained in the starting crude 2,6-NA, but usually 0.1 to 10 percent by weight, preferably 0.5 to 5 percent by weight, based on 2,6-NA.

By subjecting an aqueous solution of a dialkali salt of the crude 2,6-naphthalenedicarboxylic acid to a decolorization treatment using a solid adsorbent, most of the coloring substances can be removed. In addition, the heavy metal catalyst used for oxidation of impurities such as aldehydes can also be adsorbed and removed. For example, when crude 2,6-naphthalenedicarboxylic acid containing cobalt or manganese (generally used as an oxidation catalyst) is dissolved in an alkali hydroxide, the cobalt or manganese becomes gelled cobalt hydroxide or manganese hydroxide and floats to the surface of the solution. Accordingly, they can be completely adsorbed and removed by the solid adsorbent.

When an aqueous solution of an ammonium salt or monomethylamine salt of 2,6-NA is contacted with active carbon, almost all of the aldehydes are adsorbed to the activated carbon and removed.

When a strong alkali such as sodium hydroxide or potassium hydroxide is used as the alkali (that is, when the pH of the aqueous solution of the dialkali salt is high), the degree of adsorption of the aldehydes is reduced. If this is the case, it is advantageous to carry out heat-treatment during the operation of removing the aldehydes.

By the above solid adsorbent treatment, a greater part of the coloring substances and a considerable part or a greater part of the aldehydes can be separated and removed from the precipitated M-NA obtained in step B. When the above solid adsorbent treatment is effected, or when the operation of removing aldehydes (to be described below) is performed together with this treatment, it is possible to remove almost all of the aldehydes contained in crude 2,6-NA.

ALDEHYDE REMOVING OPERATION

This operation can be performed, for example, by subjecting an aqueous solution of a dialkali salt of the crude 2,6-naphthalenedicarboxylic acid to (1) a heat treatment wherein the aqueous solution is heated to at least 60°C. in the presence of potassium hydroxide or sodium hydroxide, (2) an oxidation treatment using an oxidant, and (3) a reducing treatment using a reducing agent. The heat-treatment (1) involves heating an aqueous solution of crude $M_2$-NA obtained in step A at 60° – 350°C., preferably 80° to 300°C., especially preferably 100° – 250°C. in the presence of potassium hydroxide or sodium hydroxide. If the heating temperature is lower than 60°C., the effect of removing the impurities such as coloring substances or aldehydes is small. At temperatures higher than 350°C., decomposition of 2,6-naphthalenedicarboxylic acid occurs. The heat-treatment time differs according to the treating temperature. Preferably, it is about 0.2 to 10 hours when the temperature is 60° to 100° C., and about 0.1 to 5 hours when it is the temperature is not less than 100°C.

Preferably, this heat-treatment is carried out at the same time as the dissolving of the crude 2,6-NA obtained by oxidation in an aqueous alkali solution, but may also be effected after the solid adsorbent treatment described above.

The oxidation treatment (2) is preferably carried out by using an oxidant such as an alkali bichromate, alkali permanganate or alkali perhalogenate. The oxidation treatment is carried out at 0° to 300°C. by adding the oxidant to an aqueous solution of the dialkali salt. When the oxidant is an alkali permanganate or alkali perhalogenate, the oxidation treatment is preferably carried out at 0° to 100°C. If it is an alkali bichromate, it is preferably carried out for 0.1 to 3 hours at 100° to 300°C. At this time, the pressure may be one sufficient for maintaining the aqueous solution in the liquid state.

The amount of the oxidant differs according to the impurities contained in crude 2,6-NA, but is usually 0.1 to 20 percent by weight based on the crude 2,6-NA.

The above-described oxidation treatment can also be carried out either before or after the solid adsorbent treatment. It is advantageous however to carry it out before the solid adsorbing treatment because the resulting precipitated chromium oxide or manganese dioxide can be removed by adsorption to a solid adsorbent.

Furthermore, the reducing treatment (3) is carried out by adding a reducing agent such as hydrogen gas, sodium dithionite, lithium aluminum hydride or sodium boron hydride to an aqueous solution of the crude $M_2$-NA. These reducing agents may be used alone or in admixture. When the reducing agent is added to an aqueous solution of the dialkali salt, it is recommended to maintain the temperature of the aqueous solution at 0° to 100°C. Especially when the reducing agent is lithium aluminum hydride, it is preferred to adjust the temperature of the aqueous solution to 10° to 40°C. When the reducing agent is boron hydroxide, it is preferred to adjust the temperature of the aqueous solution to 50° to 100°C. This temperature adjustment contributes to a rapid progress of the reaction.

The amount of the reducing agent used depends upon the amounts of the impurities contained in crude 2,6-naphthalenedicarboxylic acid. Usually, the amount of the reducing agent is suitably 0.01 to 10 percent by weight based on the crude 2,6-naphthalenedicarboxylic acid.

This reducing treatment may also be carried out before or after the treatment with a solid adsorbent.

According to the present invention, more purified 2,6-NA can be obtained also by concentrating or crystallizing the aqueous solution of crude $M_2$-NA.

CONCENTRATION AND CRYSTALLIZATION TREATMENT

This treatment can be performed by concentrating the aqueous solution of crude $M_2$-NA obtained in step A to precipitate 50 to 95 percent by weight of the $M_2$-NA dissolved in the aqueous solution. This procedure gives more purified $M_2$-NA. The resulting $M_2$-NA is dissolved again in water and may be recycled to steps B and C. This treatment may be performed before or after the solid adsorbent treatment and/or the aldehyde removing operation.

The above concentrating and precipitating treatment is preferably carried out by heating the aqueous solution of crude $M_2$-NA at a reduced pressure, atmospheric pressure or an elevated pressure at 60° to 150°C. to precipitate 50 to 95 percent by weight of the $M_2$-NA dissolved in the aqueous solution.

This procedure makes it possible to separate and remove a considerable part of the impurities contained in the crude 2,6-NA.

By performing the present invention in the manner described above, excellent purifying effects can be obtained. Such effects cannot be obtained merely by applying a similar purifying method for other aromatic dicarboxylic acids to 2,6-naphthalene carboxylic acids. The inventive features of the present invention have not been known previously, and the process of the present invention is a unique and essential step for the purification of 2,6-naphthalenedicarboxylic acids. Polyesters obtained by polycondensing the resulting purified 2,6-naphthalenedicarboxylic acids with ethylene glycol for example have very good color, and are suitable for production of fabricated articles such as fibers or films.

The invention will be described in greater detail by the following Examples in which all parts and percentages are by weight. In the qualitative analysis of 2,6-NA, the isomers were analyzed by liquid chromatography (1); the aldehydes by polarography (2); cobalt and manganese elements by atomic absprption (3); bromine element by the fluorescent X-ray method (4); and coloring components by methylamine OD (5).

1. Using a high speed liquid chromatographing apparatus (Model 830, Du Pont), the measurement was made on a solution of 50 mg of the sample in 50 ml. of 0.1N sodium hydroxide under the conditions: column AAX (Du Pont) 2.1 mm$\theta$ x 1 m, column pressure 200 psi, temperature 22°C., carrier solution (0.02M-$NaNO_3$) and buffer (0.05 M -$H_3BO_3$).

2. 2 g of the sample was dissolved in 8 g of a 25 percent aqueous solution of methylamine, and the polarogram of the solution was measured.

3. 100 g of the sample was dissolved in conc. sulfuric acid after converting it to ash, and the degree of absorption was measured at a wavelength of 352.9 m$\mu$ (cobalt element) and 279.7 m$\mu$ (manganese element).

4. 10 g of the sample was fabricated, and the measurement was made under the following conditions: spectrum Br K$\alpha$ ray, X-ray tube, tungsten 30 KV-30 mA.

5. A solution of 1 g of the sample in 10 g of a 25 percent aqueous solution of methylamine was used, and the optical density was measured using light of wavelength 500 m$\mu$ and a 1 cm cell.

REFERENTIAL EXAMPLES 1 and 2

Production of Crude 2,6-Naphthalenedicarboxylic Acid

A titanium pressure reactor equipped with a reflux condenser at its upper part leading to an exhaust port, a gas blow inlet at its bottom, a material feed inlet and an outlet for withdrawing the resulting product and also a stirrer was maintained at a reaction temperature of 200°C. and a reaction pressure of 20 Kg/cm²G, and 100 parts/hour of the material of the following composition was fed from the feed inlet. Compressed air was continuously fed from the gas blow inlet at a rate of 50 parts per hour. The reaction mixture was withdrawn continuously from the reactor so that the average residence time of the mixture was about 1 hour.

| Starting material | | | |
|---|---|---|---|
| 2,6-Dimethyl naphthalene | | 10 | parts |
|   Purity | 98.0 % | | |
|   1,5-dimethylnaphthalene | 0.4 % | | |
|   1,6-dimethylnaohthalene | 0.8 % | | |
|   1,7-dimethylnaphthalene | 0.3 % | | |
|   Other compounds | 0.5 % | | |
| Glacial acetic acid | | 100 | parts |
| Cobalt acetate tetrahydrate | | 0.5 | part |
| Manganese acetate tetrahydrate | | 1.0 | part |
| Ammonium bromide | | 1.0 | part |

The reaction mixture withdrawn from the reactor was separated by filtration at 70°C., and washed twice with 10 times the weight of the resulting precipitate with acetic acid heated to 100°C., followed by drying. There was obtained crude 2,6-naphthalenedicarboxylic acid having the composition shown in Table 1.

The above procedure was repeated except that the reaction temperature was 160°C. (Referential Example 2). The composition of the resulting crude 2,6-naphthalenedicarboxylic acid is shown in Table 1 below.

Table 1

| | Referential Example 1 | Referential Example 2 |
|---|---|---|
| 2,6-Naphthalenedicarboxylic acid | 98.1 % | 94.6 % |
| 1,5-Naphthalenedicarboxylic acid | 0.4 % | 0.4 % |
| 1,6-Naphthalenedicarboxylic acid | 0.5 % | 0.5 % |
| 1,7-Naphthalenedicarboxylic acid | 0.2 % | 0.2 % |
| 6-Carboxy-2-naphthoaldehyde | 0.2 % | 3.4 % |
| Other compounds | 0.6 % | 0.9 % |
| Cobalt element | 200 ppm | 400 ppm |
| Manganese element | 500 ppm | 600 ppm |
| Bromine element | 1000 ppm | 1200 ppm |
| Methylamine OD | 0.64 | 1.4 |

EXAMPLES 1 AND 2 AND COMPARATIVE EXAMPLES 1 AND 2 (EXAMPLES SHOWING pH EFFECTS)

Step A 100 parts of crude 2,6-NA obtained in Referential Example 1 was suspended in 800 parts of a 5 percent aqueous solution of sodium hydroxide, and the suspension was heated at atmospheric pressure to a temperature near the boiling point to dissolve a greater part of the crude 2,6-NA. The resulting solution was hot filtered to remove small amounts of alkali-insoluble substances. The resultant filtrate had a pH of 11.6.

Step B 100 parts of the filtrate obtained in step A was maintained at 60°C., and with stirring, 6N hydrochloric acid was gradually added in the amount indicated in Table 2 below. The mixture was cooled to 20°C. with continued stirring for an additional 30 minutes, and the precipitate was separated by filtration.

The precipitate shown in Table 2 was obtained.

Step C 10 parts (calculated as the dry weight) of the precipitate obtained in step B was suspended in 200 parts of water, and the suspension was heated to about 90°C. 10 parts of 6N hydrochloric acid was added and then the mixture was refluxed for 30 minutes and was hot filtered. The resulting cake was washed twice with 200 parts of hot water, and dried to form purified 2,6-NA having the composition shown in Table 2.

Table 2

|  | Example 1 | Example 2 | Comp. 1 | Comp. 2 |
|---|---|---|---|---|
| [Step B] | | | | |
| Amount of 6N HCl | 9 parts | 9.5 parts | 12 parts | 20 parts |
| pH of acid-precipitated slurry (60°C.) | 7.0 | 6.4 | 5.8 | <1 |
| pH of acid-precipitated slurry (30°C.) | 7.4 | 6.7 | 6.1 | <1 |
| Precipitate (calculated as dry weight) | 10.9 parts | 11.5 parts | 12.0 parts | 10.8 parts |
| Na content of the precipitate | 9.6% | 9.3% | 7.6% | <0.1% |
| Ratio of 2,6-naphthalene-dicarboxylic acid precipitated | 91 mol% | 95 mol% | >99 mol% | >99 mol% |
| [Step C] | | | | |
| Recovered 2,6-naphthalene-dicarboxylic acid | 9.0 parts | 9.0 parts | 9.2 parts | 9.9 parts |
| [Quality of purified 2,6-NA] | | | | |
| Content of 1,5-naphthalene-dicarboxylic acid | <0.1% | <0.1% | 0.3% | 0.4% |
| Content of 1,6-naphthalene-dicarboxylic acid | <0.1% | <0.1% | 0.4% | 0.5% |
| Content of 1,7-naphthalene-dicarboxylic acid | <0.1% | <0.1% | 0.2% | 0.2% |
| Content of 6-carboxy-2-naphthoaldehyde | 0.07% | 0.08% | 0.11% | 0.11% |
| Contents of cobalt and manganese elements | <1ppm | <1ppm | <1ppm | <1ppm |
| Content of bromine element | 10ppm | 40ppm | 280ppm | 400ppm |
| Methylamine OD | 0.09 | 0.10 | 0.28 | 0.42 |

EXAMPLE 3 AND COMPARATIVE EXAMPLE 3 (SHOWING THE EFFECT OF THE DEGREE OF PRECIPITATION USING $CO_2$)

Step A

Step A of Example 1 was repeated except that 560 parts of a 10 percent aqueous solution of potassium hydroxide was used as the alkali. The resulting filtrate had a pH of 11.8.

Step B

A pressure reactor equipped with a gas inlet tube and a stirrer was charged with 100 parts of the filtrate obtained in Step A, and with stirring, carbon dioxide gas was introduced at 30°c. for 3 hours at a rate of 3 parts per hour at the pressure indicated in Table 3 below. The resulting reaction mixture was filtered by a pressure filter, and the resulting cake was washed with a small amount of water, to afford a monopotassium salt of a 2,6-naphthalenedicarboxylic acid as a precipitate as shown in Table 3.

Step C 10 parts (calculated as the dry weight) of the monopotassium 2,6-naphthalenedicarboxylate obtained in step B was suspended in 200 parts of water, and the suspension was heated to about 90°C. 10 parts of 6N hydrochloric acid was added, and the mixture was refluxed for 30 minutes. The mixture was then hot filtered. The resulting cake was washed twice with 200 parts of hot water, and dried to form purified 2,6-NA.

Table 3

|  | Example 3 | Comparative Example 3 |
|---|---|---|
| [Step B] | | |
| Reaction pressure | 1 atm. | 5 atms. |
| pH at the end of reaction | 7.8 | 7.2 |
| Amount of the monopotassium salt precipitated(calculated as the dry weight) | 16.1 parts | 17.2 parts |
| K content of the precipitate | 15.0% | 14.8% |
| Degree of precipitation of 2,6-naphthalenedicarboxylic acid | 92 mol% | 98.5 mol% |
| [Step C] | | |
| Recovered 2,6-naphthalenedicarboxylic acid | 8.3 parts | 8.3 parts |
| [Quality of purified 2,6-NA] | | |
| 1,5-NA content | <0.1% | 0.3% |
| 1,6-NA content | <0.1% | 0.3% |
| 1,7-NA content | <0.1% | 0.1% |
| 6-Carboxy-2-naphthoaldehyde | 0.08% | 0.2% |
| Contents of cobalt and manganese | <1ppm | <1ppm |
| Bromine content | 20ppm | 120ppm |
| Methylamine OD | 0.09 | 0.22 |

Example 4 (SHOWING THE DECOLORIZATION EFFECT)

Step A 100 parts of the crude 2,6-NA obtained in Referential Example 1 was dissolved in 800 parts of a 5 percent aqueous solution of sodium hydroxide by heating, and the solution was cooled to 20°C. Furthermore, 6 parts of activated carbon having a moisture content of 50 percent was added, and the mixture was stirred for 30 minutes, followed by filtration.

6 parts of activated carbon was again added to the filtrate, and the mixture was stirred for 30 minutes, followed by filtration. The filtrate had a pH of 11.6.

Step B

The same procedure as Step B of Example 1 was repeated except that 100 parts of the filtrate obtained in Step A was used. There was obtained 10.9 parts (as dry weight) of a precipitate.

Step C

Step C of Example 1 was repeated except that 10 parts (calculated as dry weight) of the precipitate obtained in Step B was used. There was obtained 9 parts of purified 2,6-NA. The quality of purified 2,6-NA obtained was as follows

| Quality of the purified 2,6-NA | |
|---|---|
| 1,5-NA content | <0.1 % |
| 1,6-NA content | <0.1 % |
| 1,7-NA content | <0.1 % |
| Contents of cobalt and manganese | <20 ppm |
| 6-Carboxy-2-naphthoaldehyde | <1 ppm |
| Content of elemental bromine | 10 ppm |
| Methylamine OD | 0.020 |

EXAMPLE 5 (SHOWING DISPROPORTIONATION)

Step B of Example 1 was repeated except that 100 parts of the filtrate obtained in Step A of Example 4 was used. There was obtained 10.9 parts (calculated as dry weight) of precipitate.

10 parts (as dry weight) of the precipitate was suspended in 200 parts of water, and the suspension was heated under reflux for 30 minutes at atmospheric pressure to perform a disproportionation reaction. The product was hot filtered. The resulting cake was washed twice with 100 parts of hot water and dried to afford 4.5 parts of purified 2,6-NA. The quality of the purified 2,6-NA was as follows:

| | |
|---|---|
| 1,5-NA content | <0.1 % |
| 1,6-NA content | <0.1 % |
| 1,7-NA content | <0.1 % |
| 6-Carboxy-2-naphthoaldehyde content | <20 ppm |
| Contents of cobalt and manganese | <1 ppm |
| Content of bromine element | <10 ppm |
| Methylamine OD | 0.016 |

The resulting purified 2,6-NA was polycondensed with ethylene glycol to form pure white 2,6-PEN.

EXAMPLE 6 AND COMPARATIVE EXAMPLE 4 (USING ACETIC ACID)

Step B 100 parts of the decolorized liquid obtained in Step A of Example 4 was heated to 60°C., and with stirring, glacial acetic acid was gradually added in the amount indicated in Table 4. The mixture was cooled to 20°C., and after stirring for 30 minutes, filtered.

Step C 5 parts or 10 parts (as dry weight) of the cake obtained in Step B was treated in the same way as in Step C of Example 1 to form free 2,6-NA.

The quality of the resulting purified 2,6-NA is shown below.

Table 4

| | Example | Comparative Example 4 |
|---|---|---|
| [Step B] | | |
| Amount of glacial acetic acid | 2 parts | 4 parts |
| pH of the acid-precipitated slurry (60°C.) | 7.0 | 5.7 |
| pH of the acid-precipitated slurry (30°C.) | 7.6 | 6.6 |
| Amount of the precipitate | 7.4parts | 11.7parts |
| Na content of the precipitate | 9.6% | 5.0% |
| Degree of precipitation of 2,6-NA | 62mol% | >99mol% |
| [Step C] | | |
| Amount of the cake precipitated in Step B | 5 parts | 10parts |
| Recovered 2,6-NA | 4.5parts | 9.5parts |
| [Quality of purified 2,6-NA] | | |
| 1,5-NA content | <0.1% | 0.4% |
| 1,6-NA content | <0.1% | 0.4% |
| 1,7-NA content | <0.1% | 0.2% |
| 6-Carboxy-2-naphthoaldehyde content | <20ppm | 40ppm |
| Contents of cobalt and manganese elements | <1ppm | <1ppm |
| Content of bromine element | 10ppm | 310ppm |
| Methylamine O.D. | 0.018 | 0.12 |

EXAMPLE 7 (EXAMPLE OF A DIALKALI SALT OF AMMONIUM)

Step A 10 parts of crude 2,6-NA obtained in Referential Example 1 was added to a mixture of 5.5 parts of 30 percent aqueous ammonia and 300 parts of water, and the mixture was stirred for 30 minutes at 50°C. The solution was cooled. To the resulting solution was added 1 part of activated carbon having a moisture content of 50 percent, and the mixture was stirred for 30 minutes at 20°C. to perform a decolorization treatment. Filtration was again performed using 1 part of the activated carbon. The resulting filtrate had a pH of 9.8.

Step B

The decolorized liquid obtained in Step A was placed in the same reactor as used in Example 3, and with stirring, carbon dioxide gas was passed into it for 3 hours at 20°C. and atmospheric pressure. The pH of the reaction mixture at this time was 6.6. After the reaction, the precipitate was separated by filtration from the reaction mixture, and there was obtained 9.1 parts of a monoammonium salt of 2,6-NA. The degree of precipitation of the monoammonium salt was 87 mol percent.

Step C 9.1 parts of the resulting monoammonium salt was suspended in 200 parts of water, and then the same procedure as in Step C of Example 1 was performed to obtain 8.4 parts of purified 2,6-NA. The quality of the resulting purified 2,6-NA is shown in Table 5.

EXAMPLE 8 (EXAMPLE OF A DIALKALI SALT OF METHYLAMINE)

Step A 50 parts of crude 2,6-NA obtained in Referential Example 1 was dissolved in 200 parts of a 10 percent aqueous solution of monomethylamine. To the resulting solution was added 3 parts of activated carbon having a moisture content of 50 percent. After stirring for 30 minutes at room temperature, the mixture was subjected to filtration to perform the decolorization treatment. The filtrate obtained had a pH of 11.0.

Step B

The filtrate obtained in Step A was placed in the same reactor as used in Example 3, and with stirring, carbon dioxide gas was passed into it at 5°C. and atmospheric pressurer for 3 hours. The reaction mixture had a pH of 7.7 at this time. After the reaction, the precipitate was separated by filtration from the reaction mixture to afford 33.6 parts of a monoalkali salt of monomethylamine of 2,6-NA. The degree of precipitation of the monoalkali salt was 63 mol percent.

Step C 10 parts (as dry weight) of the monoalkali salt was suspended in 200 parts of water, and then the same procedure as in Step C of Example 1 was performed to afford 8.6 parts of purified 2,6-NA. The quality of the resulting purified 2,6-NA is shown in Table 5.

Table 5

|  | Example 7 | Example 8 |
|---|---|---|
| 1,5-NA content | <0.1 % | <0.1 % |
| 1,6-NA content | <0.1 % | <0.1 % |
| 1,7-NA content | <0.1 % | <0.1 % |
| 6-Carboxy-2-naphthoaldehyde | <20 ppm | <20 ppm |
| Contents of cobalt and manganese | <1 ppm | <1 ppm |
| Bromine element content | 10 ppm | 40 ppm |
| Methylamine OD | 0.008 | 0.010 |

EXAMPLE 9 (EXAMPLE OF CRYSTALLIZATION)

Step A 100 parts of the crude 2,6-NA obtained in Referential Example 2 was dissolved by heating in 1,000 parts of a 5 percent aqueous solution of sodium hydroxide, and the solution was refluxed for 30 minutes at the boiling point of the solution at atmospheric pressure, followed by cooling it to 20°C. 2 parts of activated carbon having a moisture content of 50 percent was added to the resulting solution, and the mixture was stirred for 30 minutes, followed by filtration. The filtrate was again subjected to a decolorization treatment using 2 parts of the same activated carbon. 50 parts of sodium carbonate was added to the resulting decolorized filtrate, and water was evaporated until the total amount of the mixture became about 400 parts thereby to precipitate a disodium salt of 2,6-NA. The resulting concentrated slurry was cooled to 50°C., and separated by filtration. The cake was washed with a small amount of water to afford 101 parts (calculated as anhydride) of a disodium salt of 2,6-NA. The degree of precipitation of the 2,6-NA content was 88 mol percent.

Step B

The disodium salt of 2,6-NA obtained in Step A was again dissolved in 400 parts of water, and the solution was charged into the same reactor as used in Example 3. With stirring, carbon dioxide gas was passed into the reactor at 20°C. and 5 atmospheres for 3 hours. The reaction mixture at this time had a pH of 7.3. After the reaction, the precipitate was separated from the reaction mixture by filtration to afford 75 parts of a monosodium salt of 2,6-NA. The degree of precipitation of the 2,6-NA component was 81 mol percent.

Step C 75 parts of a monosodium salt of 2,6-NA obtained in Step B was suspended in 675 parts of water, and the suspension was heated under reflux for 30 minutes to perform a disproportionation reaction. The 2,6-NA precipitated was separated by hot filtration, washed twice with 750 parts of hot water, and dried. There was obtained 34 parts of purified 2,6-NA of the following quality.

| 1,5-NA content | <0.1 % |
|---|---|
| 1,6-NA content | <0.1 % |
| 1,7-NA content | <0.1 % |
| 6-Carboxy-2-naphthaldehyde content | <10 ppm |
| Contents of cobalt and manganese elements | <1 ppm |
| Content of bromine element | <10 ppm |
| Methylamine OD | 0.005 |

EXAMPLES 10 TO 12 (EXAMPLES WHEREIN THE ALDEHYDES WERE REMOVED)

Step A 100 parts of the crude 2,6-NA obtained in Referential Example 2 was dissolved by heating in 560 parts of a 10 percent aqueous solution of potassium hydroxide. 100 parts of the resulting solution was treated to remove the aldehydes contained therein as shown in Table 6 below. After treatment, 1 part of activated carbon having a moisture content of 50 percent was added to the solution at room temperature. The mixture was stirred for 30 minutes, and the activated carbon was separated by filtration. The resulting filtrate had a pH of 11.8.

Step B

The filtrate obtained in Step A was heated to 60°C. and with stirring, 6N hydrochloric acid was gradually added until its pH reached 7.0. Thus, a monopotassium salt of 2,6-NA was precipitated. After acid precipitation, the slurry was cooled to 20°C., and after stirring for an additional 30 minutes, separated by filtration. The reaction mixture at this time had a pH of 7.2 to 7.3. The degree of precipitation of the 2,6-NA component was 72 to 75 mol percent.

Step C 10 parts of the monopotassium salt obtained in Step B was suspended in 200 parts of water, and the suspension was treated in the same way as in Step C of Example 1 to afford purified 2,6-NA. The quality of the purified 2,6-NA is shown in Table 6.

Table 6

|  | Example 10 | Example 11 | Example 12 |
|---|---|---|---|
| [Step A] Aldehyde removing treatment | Heating at 150°C. for 2 hours | Oxidation (heating at 90°C. for 3 hours on addition | Reduction (0.3 part of LiAlH$_4$ was added gradually, and the |

Table 6 – Continued

|  | Example 10 | Example 11 | Example 12 |
|---|---|---|---|
|  |  | of 1 part of KMnO$_4$) | mixture stirred for 30 minutes at room temperature) |
| [Quality of purified 2,6-NA] | | | |
| 1,5-NA content | <0.1 % | <0.1 % | <0.1 % |
| 1,6-NA content | <0.1 % | <0.1 % | <0.1 % |
| 1,7-NA content | <0.1 % | <0.1 % | <0.1 % |
| Content of 6-carboxy-2-naphthaldehyde | <20 ppm | <20 ppm | <20 ppm |
| Contents of cobalt and manganese elements | <1 ppm | <1 ppm | <1 ppm |
| Bromine element content | 10 ppm | 10 ppm | 10 ppm |
| Methylamine OD | 0.006 | 0.008 | 0.008 |

EXAMPLE 13 AND COMPARATIVE EXAMPLE 5 (EXAMPLE SHOWING THE EFFECT OF THE pH)

Step A 100 parts of the crude 2,6-NA obtained in Referential Example 2 was suspended in 800 parts of a 5 percent aqueous solution of sodium hydroxide, and the suspension was heated to a temperature near the boiling point of the suspension at atmospheric pressure to dissolve most of the crude 2,6-NA Minor amounts of the alkali-insoluble matters were separated by hot filtration. The filtrate obtained had a pH of 11.6.

Step B 100 parts of the filtrate obtained in Step A was maintained at 60°C., and with stirring, 6N hydrochloric acid was added gradually in the amount indicated in Table 7. The mixture was then cooled to 20°C., with further stirring for an additional 30 minutes, and the precipitate was separated by filtration.

Step C 10 parts (calculated as dry weight) of the precipitate obtained in Step B was suspended in 200 parts of water, and the suspension was heated to near 90°C. 10 parts of 6N hydrochloric acid was added, and the mixture was refluxed for 30 minutes. The precipitated 2,6-NA was hot filtered. The resulting cake was washed twice with 200 parts of hot water, and dried to afford purified 2,6-NA as shown in Table 7.

Table 7

|  | Example 13 | Comparative Example 5 |
|---|---|---|
| [Step B] | | |
| Amount of 6N hydrochloric acid | 9 parts | 20 parts |
| pH of the acid-precipitated slurry (60°C.) | 7.1 | <1 |
| pH of the acid-precipitated slurry (30°C.) | 7.4 | <1 |
| Amount of the precipitate (dry weight) | 10.8 parts | 10.6 parts |
| Na content of the precipitate | 9.6 % | <0.1 % |
| Degree of precipitation of 2,6-NA | 92 mol% | >99 mol% |
| [Step C] | | |
| Amount of the recovered 2,6-naphthalene-dicarboxylic acid | 9.0 parts | 9.9 parts |
| [Quality of purified 2,6-NA] | | |
| 1,5-NA content | <0.1 % | 0.4 % |
| 1,6-NA content | <0.1 % | 0.5 % |
| 1,7-NA content | <0.1 % | 0.2 % |
| Content of 6-carboxy-2-naphthaldehyde | 0.92 % | 2.8 % |
| Contents of cobalt and manganese elements | <1 ppm | <1 ppm |
| Content of bromine element | 20 ppm | 450 ppm |
| Methylamine OD | 0.10 | 0.62 |

EXAMPLE 14

This Example illustrates the use of an ion-exchange resin as the solid adsorbent.

Step A 100 parts of the crude 2,6-NA obtained in Referential Example 1 was dissolved by heating in 800 parts of a 5 percent aqueous solution of sodium hydroxide, and the solution was cooled to 20°C. The cooled solution was passed through a column packed with 10 parts of an ion exchange resin (Dowex 2-X8, trademark of Dow-Chemical, Cl type, 20–50 mesh) at a linear velocity of 1 cm/min. The decolorized liquid obtained had a pH of 11.5.

Step B 7 parts of 6N hydrochloric acid was added gradually in the same way as in Example 4 using 100 parts of the decolorized liquid obtained in Step A. When the mixture had a pH of 7.4, the precipitate was separated by filtration.

Step C

Using 10 parts of the resulting precipitate, 2,6-NA was freed in the same way as in Example 4, and 9 parts of purified 2,6-NA was obtained. The quality of the purified 2,6-NA was as follows:

| | |
|---|---|
| 1,5-NA content | <0.1 % |
| 1,6-NA content | <0.1 % |
| 1,7-NA content | <0.1 % |
| Content of 6-carboxy-2-naphthaldehyde | <20 ppm |
| Contents of cobalt and manganese elements | <1 ppm |
| Bromine element content | 10 ppm |
| Methylamine OD | 0.025 |

What we claim is:
1. A method for purifying a crude 2,6-naphthalenedicarboxylic acid obtained by the oxidation of a 2,6-dialkylnaphthalene, which comprises a. preparing an aqueous solution of a dialkali salt of said crude 2,6-naphthalenedicarboxylic acid, whose alkali moieties are derived from one of the group consisting of: sodium and potassium hydroxides, carbonates, hydrogen carbonates, sulfites, and bisulfites; aqueous ammonia; and aqueous solutions of water-soluble organic amines, b. precipitating 40 to 97 mol percent of the dialkali 2,6-naphthalenedicarboxylate dissolved in said aqueous solution substantially as a monoalkali salt of the 2,6-naphthalenedicarboxylic acid while maintaining the pH of said aqueous solution at a value not lower than 6.3, and separating the precipitate, and c. converting the separated precipitate to a 2,6-naphthalenedicarboxylic acid.

2. The method of claim 1 wherein the monoalkali 2,6-naphthalenedicarboxylate is precipitated while the pH of the aqueous solution of the dialkali 2,6-naphthalenedicarboxylate is being maintained at a value not lower than 6.8.

3. The method of claim 1 wherein 50 to 95 mol percent of the dialkali 2,6-naphthalenedicarboxylate dissolved in said aqueous solution is precipitated substantially as a monoalkali salt of the 2,6-naphthalenedicarboxylic acid.

4. The method of claim 1 wherein said aqueous solution of the crude dialkali 2,6-naphthalenedicarboxylate is treated with a solid adsorbent, and then a monoalkali salt of the 2,6-naphthalenedicarboxylic acid is precipitated from said aqueous solution.

5. The method of claim 1 wherein said aqueous solution of the crude dialkali 2,6-naphthalenedicarboxylate is concentrated to precipitate 50 to 95 percent by weight of said dialkali salt dissolved in said aqueous solution, the precipitated dialkali salt is dissolved in water, and a monoalkali salt of the 2,6-naphthalenedicarboxylic acid is precipitated from this aqueous solution.

6. The method of claim 1 wherein the monoalkali 2,6-naphthalenedicarboxylate precipitated and separated is suspended in water, and the suspension is subjected to disproportionation or acid precipitation to convert said monoalkali salt to a 2,6-naphthalenedicarboxylic acid.

7. The method of claim 1 wherein said crude 2,6-naphthalenedicarboxylic acid is formed into an aqueous solution of its dipotassium, disodium or diammonium salt.

8. The method of claim 2 wherein the pH is not lower than 7.0.

9. The method of claim 1 with the additional step of heating the aqueous solution of the dialkali salt of step (a), prior to the precipitation of step (b), to a temperature of from 60° to 350°C. in the presence of one of the group consisting of sodium hydroxide and potassium hydroxide.

10. The method of claim 1 with the additional step of oxidizing the aqueous solution of the dialkali salt of step (a), prior to the precipitation of step (b), by adding an oxidant selected from one of the group consisting of an alkali bichromate, an alkali permanganate, or an alkali perhalogenate, to the aqueous solution at a temperature of from 0° to 100°C. when an alkali permanganate or alkali perhalogenate is employed and from 100° to 300°C. when an alkali bichromate is employed.

11. The method of claim 1 with the additional step of reducing the aqueous solution of the dialkali salt of step (a), prior to the precipitation of step (b), by adding a reducing agent selected from one of the group consisting of hydrogen gas, sodium dithionite, lithium aluminum hydride, or sodium boron hydride to the aqueous solution at a temperature of from 0° to 100°C., with the provisos that when the reducing agent is lithium aluminum hydride the temperature is from 10° to 40°C., and when the reducing agent is boron hydroxide the temperature is from 50° to 100°C.

* * * * *